Aug. 3, 1943.  A. T. FLETCHER  2,325,943
GLASS CUTTER
Filed June 23, 1941

INVENTOR
ARTHUR T. FLETCHER
By
ATTORNEY

Patented Aug. 3, 1943

2,325,943

UNITED STATES PATENT OFFICE 2,325,943

GLASS CUTTER

Arthur T. Fletcher, Bristol, Conn.

Application June 23, 1941, Serial No. 399,318

2 Claims. (Cl. 206—46)

My invention relates to glass cutters.

It has among its objects to provide an improved holder for a glass cutter wherein the glass cutter may be carried on the operator's person when not in use, while being protected and conveniently accessible and readily removable when desired. A further object of my invention is to provide such an improved holder wherein the same acts to retain the glass cutter in the holder and against accidental loss therefrom, and wherein improved lubricating means are provided in the holder whereby, as a result of the mere insertion of the glass cutter therein, the cutter wheel of the latter is automatically lubricated. A still further object of my invention is to provide such an improved structure which is adapted to be very conveniently attached to a worker's pocket and which is light, non-breakable, and exceedingly convenient in use, and also adapted to be manufactured at small expense. These and other objects and advantages of my improvements will, however, hereinafter more fully appear.

In the accompanying drawing, I have shown for purposes of illustration one embodiment which my invention may assume in practice.

Figure 1:
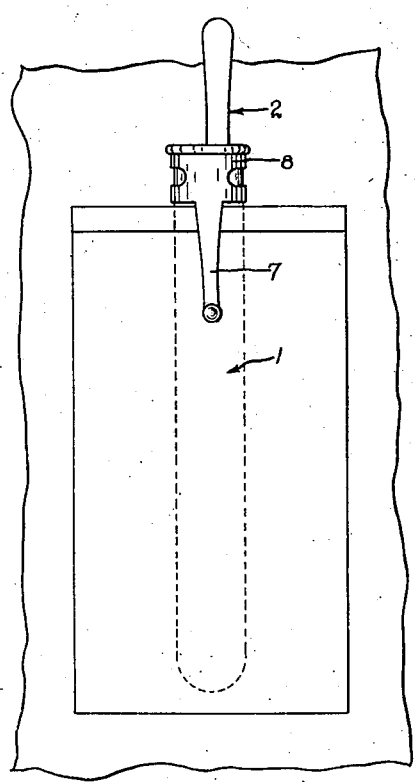
Figure 1 is a detail view showing my improved holder in position in a pocket.
Figure 2:
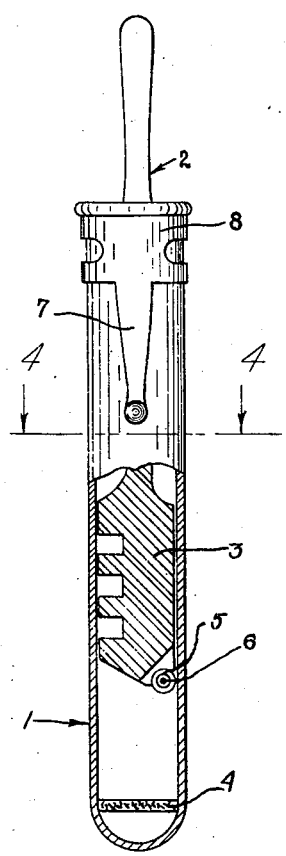
Fig. 2 is an enlarged elevational view of the holder, portions of the same and the glass cutter being shown in vertical section to facilitate illustration, and the glass cutter being shown in process of insertion in the holder.
Figure 3:
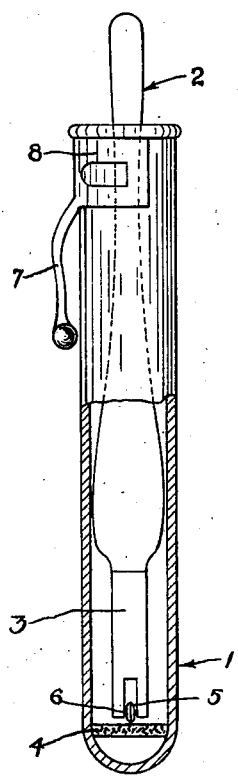
Fig. 3 is a similar view, with the glass cutter fully inserted in the holder.
Figure 4:
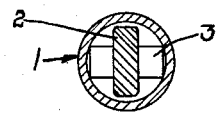
Fig. 4 is a transverse section on line 4—4 of Figure 2.

In this illustrative construction, I have shown my invention as comprising a tube, generally indicated at 1, and having a glass cutter, generally indicated at 2, received longitudinally therein; the tube 1 being of an improved construction and cooperating with the glass cutter 2 in an improved manner, as hereinafter described.

Referring more particularly to the tube 1, it will be noted that the same is of the general configuration of a test tube and of a size adapted to receive the glass cutter 2 but shorter than the glass cutter so that in the fully inserted position of the glass cutter the handle of the latter projects above the open top of the tube. This tube 1 is preferably formed of a suitable resilient plastic composition of transparent character, such, for example, as a nitro-cellulose composition or the like. This tube is also preferably of such diameter as quite snugly to receive and be slightly expanded by, the generally rectangular cutting head 3 of the glass cutter 2 as it enters the tube, in such manner as, through the resultant frictional engagement of the corners of this head 3 with the inner surface of the tube, thereby to prevent accidental loss of the glass cutter from the tube while also preventing rattling of the cutter in the tube. It will also be noted that the tube is provided near the bottom thereof with suitable lubricating means 4, herein in the form of a felt or other suitable oil-soaked disc, adapted to engage with the cutter wheel 5 of the glass cutter, and so yielding as to permit the wheel to be embedded in this oil-soaked disc when the glass cutter is pushed normally into the bottom of the tube. Attention here is also directed to the fact that the disc is so supported on the inside of the rounded bottom of the tube as to enable the disc to yield slightly when the cutter wheel 5 is forced against the same, at the same time that the oil with which the disc is saturated is supplied to the wheel and its journal 6 on the glass cutter, in such manner as thereby to insure effective lubrication of the latter. It will further be noted that herein the tube 1 carries a holding clip 7 on its upper end, of a usual spring type and having side grasping portions 8 adapted to slip longitudinally over and retain the clip on the tube, while the spring clip 7 is adapted to grip the edge of a pocket in a manner usual in fountain pens, pencils, or the like, and thereby quite securely connect the tube to the edge of a pocket in which the same is placed.

As a result of my invention, it will be evident that the glass cutter is not only protected when not in use, but very conveniently and securely carried in the holder which is, in turn, carried in the user's pocket in the general manner of a pen or pencil. Further, in addition to being lubricated each time that the glass cutter is inserted in the tube, it will be observed that the frictional engagement of the glass cutter and tube is such as to prevent accidental falling out of the glass cutter during stooping or the like, while the plastic tube is also nonbreakable and adapted to withstand rough usage. Attention is also directed to the fact that the tube also provides an attractive package for the glass cutter in which the same may be displayed or sold, with the glass cutter structure attractively displayed in lubricating position through the transparent tube, and from which the glass cutter may be readily withdrawn whenever desired for inspection or use. It will also be noted that the construction is such as to enable the lubricating holder to be very inexpensively supplied without materially increasing the cost of the glass cutter. These and other advantages of my improvements will, however, be apparent to those skilled in the art.

While I have in this application specifically described one embodiment which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In combination, a generally cylindrical holding tube having a closed bottom end, and a glass cutter having an enlarged head longitudinally receivable in said tube and having a transverse dimension slightly larger than the corresponding inner cross sectional dimension of the tube, said tube having an open end adapted to permit free entry of said head and having resilient walls extending from said open end substantially to said closed end and flexed by and gripping portions of said glass cutter to grip the latter as the same is moved into said tube.

2. In combination, a holding tube of resilient plastic material and having a closed end and an open end, a glass cutter longitudinally receivable in said tube and having a portion having a transverse dimension slightly larger than the corresponding inner cross sectional dimension of the tube thereby expanding the walls thereof to prevent accidental separation therefrom and having a cutter wheel on the extremity of said cutter, and lubrication holding means for said wheel seated in the bottom of said tube.

ARTHUR T. FLETCHER.